July 31, 1956  R. R. RANEY ET AL  2,756,887
SELF-UNLOADING VEHICLE
Filed Dec. 17, 1952  5 Sheets-Sheet 1

Inventors:
Russell R. Raney
Edwin F. Huddle
John H. Bing
Paul O. Pippel Atty.

July 31, 1956
R. R. RANEY ET AL
2,756,887
SELF-UNLOADING VEHICLE
Filed Dec. 17, 1952
5 Sheets-Sheet 2
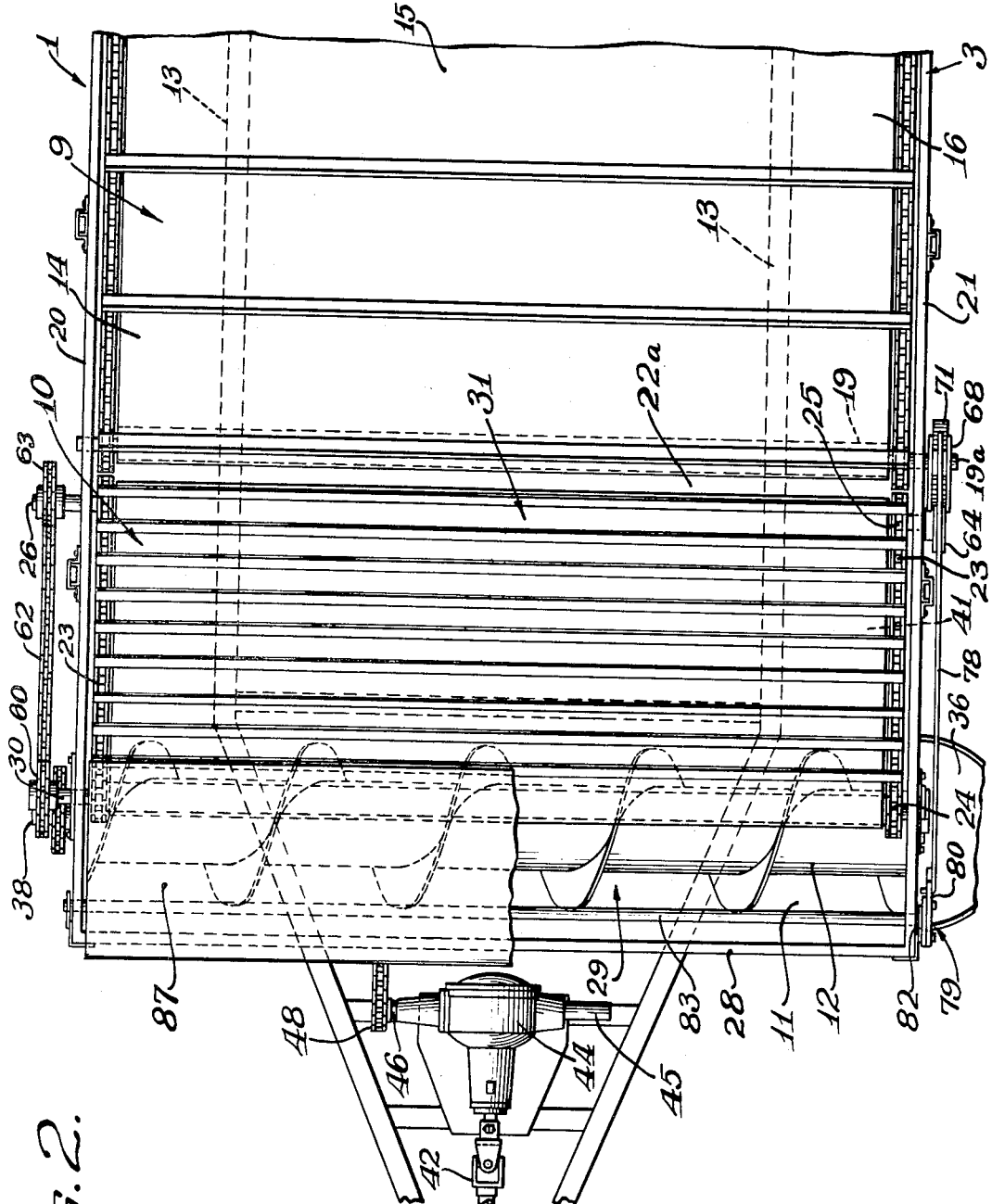
FIG.2.
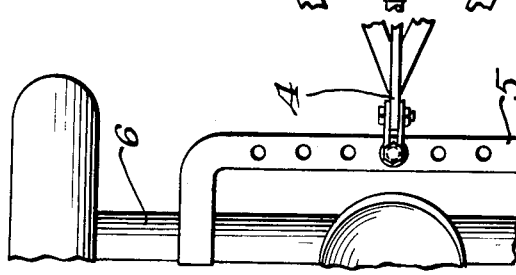
Inventors:
Russell R. Raney
Edwin F. Huddle
John H. Bing
Paul O. Pippel Atty.

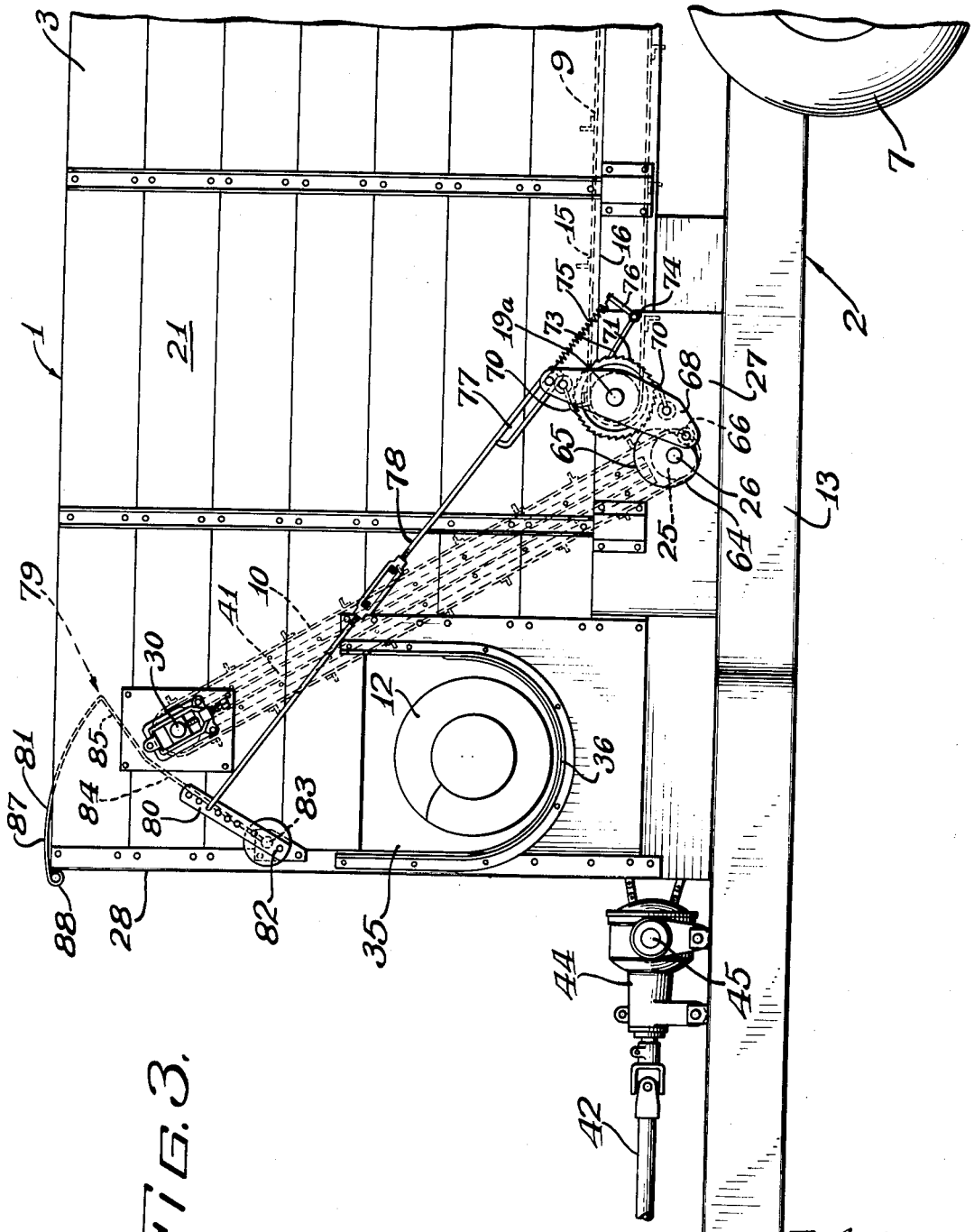

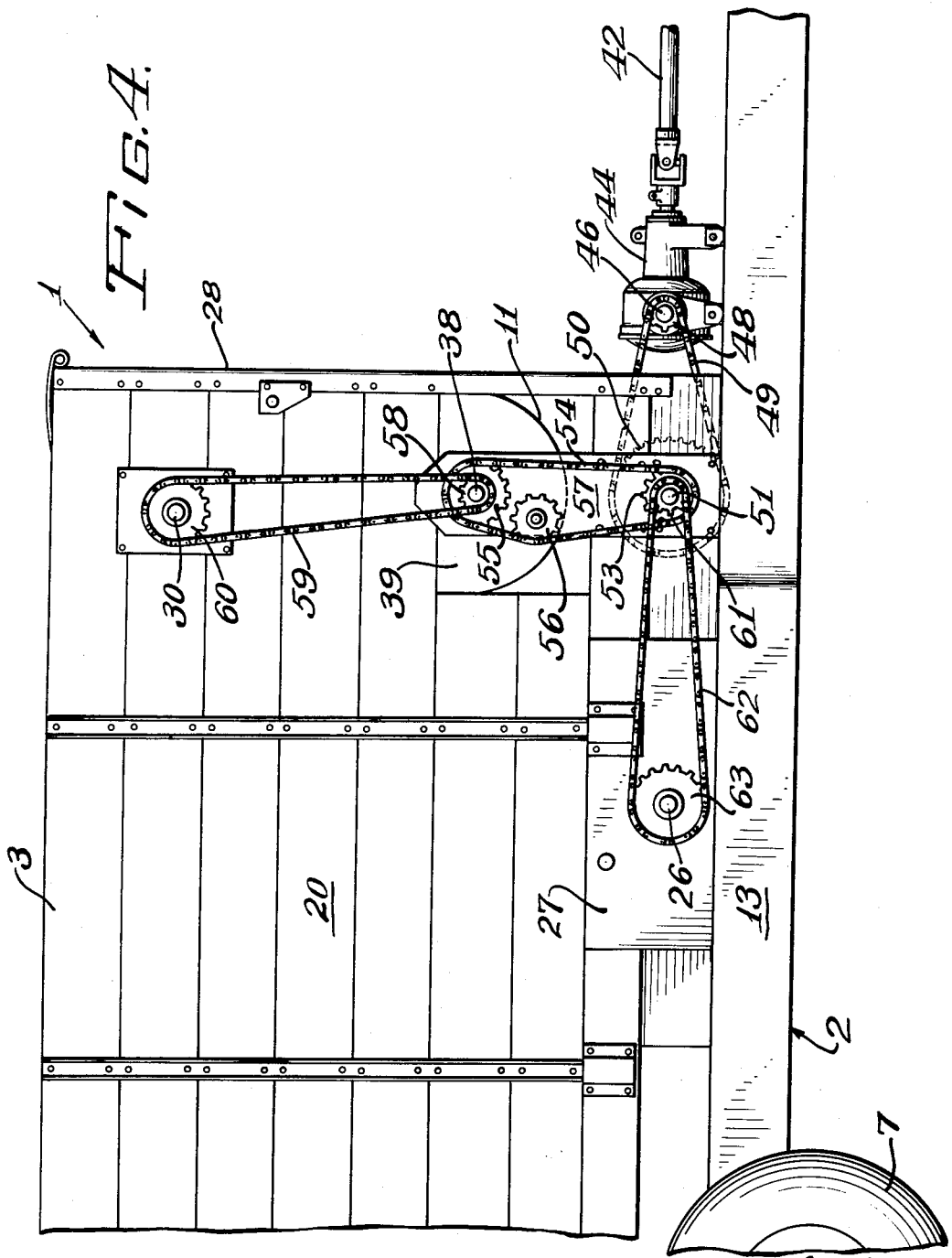

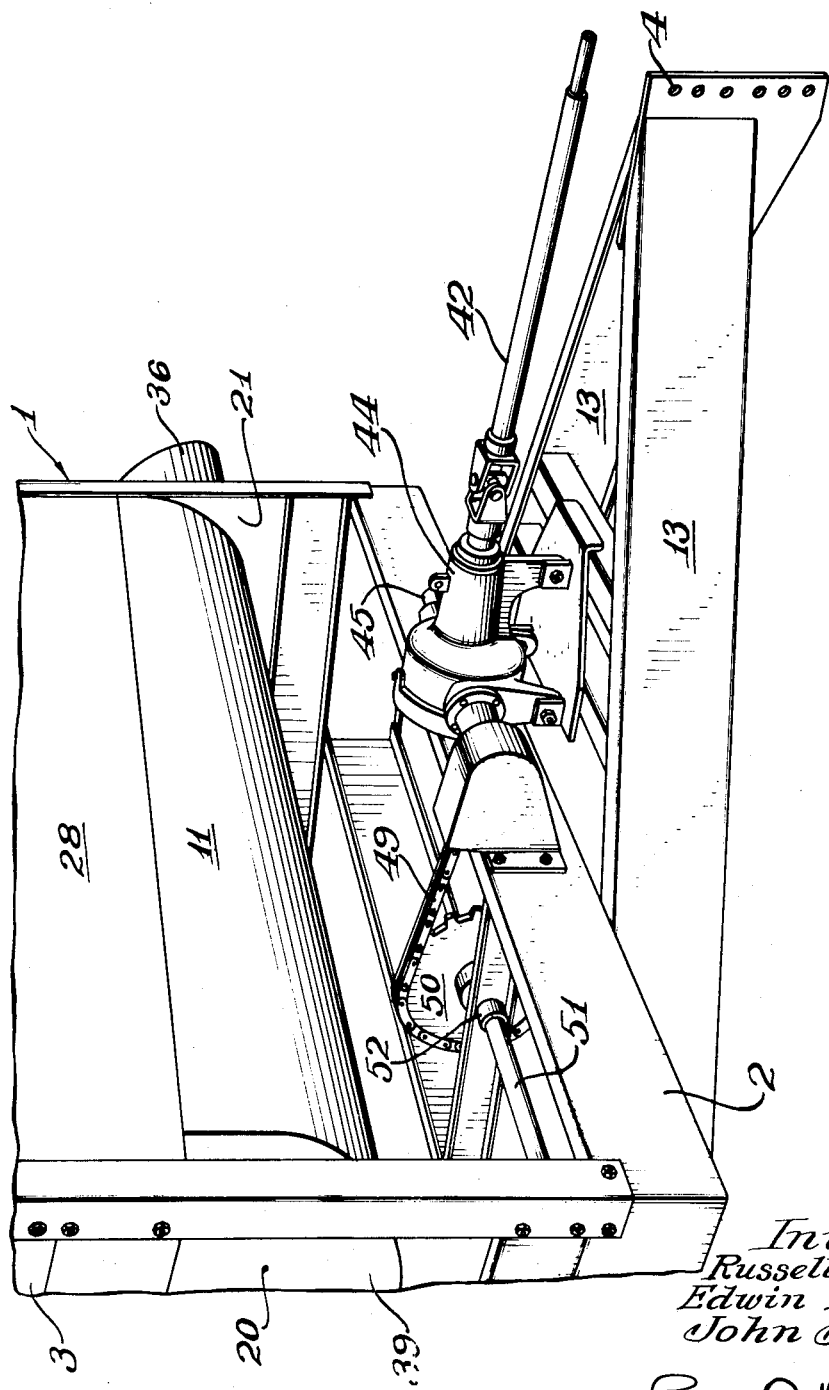

United States Patent Office 2,756,887
Patented July 31, 1956

2,756,887

SELF-UNLOADING VEHICLE

Russell R. Raney, Western Springs, Edwin F. Huddle, Elmwood Park, and John H. Bing, Downers Grove, Ill., assignors to International Harvester Company, a corporation of New Jersey Application December 17, 1952, Serial No. 326,401

10 Claims. (Cl. 214—519)

This invention relates to self-unloading vehicles and more particularly to a type featuring a side discharge.

A general object of the invention is to devise a wagon of the type adapted to be drawn by a tractor and locating the discharge point of the wagon in a position whereat it is readily visible by the tractor operator so as to facilitate alignment of the discharge with the intended receiving mechanism.

The invention is especially adaptable, however not limited thereto, to direct discharge of forage crops into a series of manger openings simply by driving the vehicle along and stopping at each opening and filling it.

The invention broadly features the provision of a discharge opening through the side of the vehicle at one of the forward corners of the vehicle box or body.

The invention further provides an arrangement wherein the drives for the various conveyor parts are shortened over that normally utilized with self-unloading vehicles.

A further object of the invention is to devise an unloading system which discharges the load from a wagon at its forward end.

The invention is particularly useful in conjunction with a single axle cart wherein the wheel and axle assembly may be positioned between the forward and rear ends of the box in order to obtain maximum load carrying capacity of the wheels with minimum cantilever stressing of the frame of the cart, and wherein the frame is afforded a forward hitch point to the tractor. It will be appreciated that in such a vehicle discharging of the load from the forward end of the vehicle effects an ideal loading condition by continuously removing the load from the box rearwardly of the supporting wheels of the cart so that the load increment last to be discharged is disposed forwardly of the wheels of the cart between the same and the hitch point to the tractor.

A still further object is to arrange a series of conveyors in a wagon box in a novel manner to obtain compactness as well as full functional utility and to provide for one-man operation.

Another object is to provide a novel discharging volume control in the conveying system.

A still further object is to arrange the conveyor components in such manner that the discharging component sweeps over the receiving component to spread the crop laterally thereacross to obtain more efficient discharge.

These and other objects of the invention will become more apparent from the specification and the drawings wherein:

Figure 2 is a fragmentary top plan view of the front end of the vehicle shown in association with a tractor;

Figure 3 is a fragmentary left side elevational view of the vehicle;

Figure 4 is a fragmentary right side elevational view, and

Figure 5 is a fragmentary forward perspective view of the vehicle.

Figure 1:
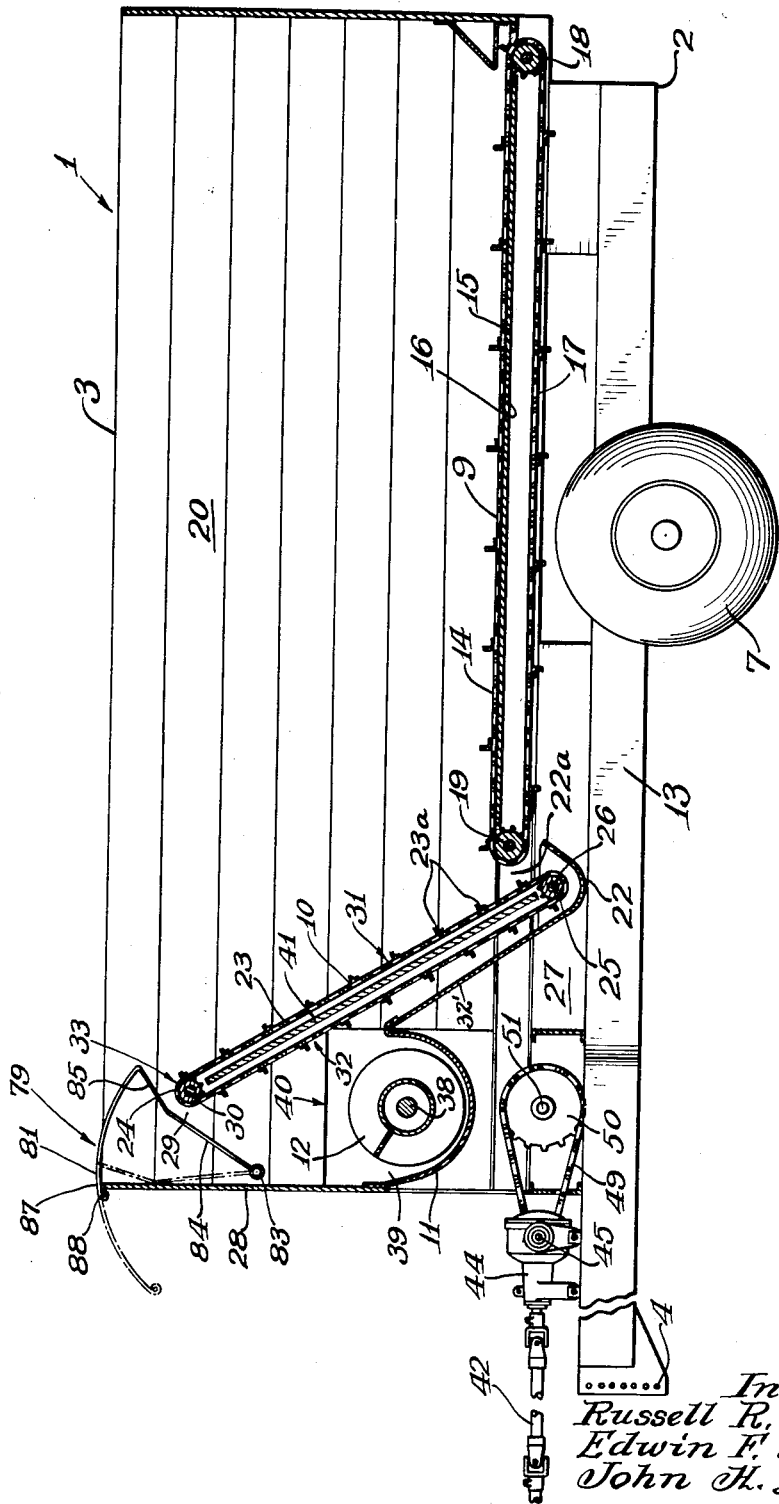
Figure 1 is a longitudinal sectional view of the novel self-unloading vehicle.

Describing the invention in detail, the self-unloading vehicle generally designated 1 is herein shown in the form of a cart comprising a chassis frame work 2 including spaced interconnected side sill members 13, 13 converged forwardly of the box 3 carried thereby to afford a forward hitch point 4 to a tractor drawbar 5 of an associated tractor 6 of conventional design.

A supporting wheel and axle assembly 7 is connected to the framework 2 and is situated transversely of the box substantially midway between the forward and rear ends thereof.

The wagon discharging means comprises a bed conveyor 9 which discharges toward the forward end of the box to a stripper elevator conveyor 10 which discharges over its upper forward end into a lateral conveyor trough 11 containing an auger conveyor 12 which discharges through an opening in a side of the box 3.

The bed conveyor 9 includes an endless cross-slat chain 14 which has a top active run 15 disposed over the bottom 16 of the box and a return run 17 which passes beneath the bottom 15 of the box. The endless belt or apron 14 is journaled on sprocketed cross-rollers 18 and 19 disposed, respectively, at the rear end of the wagon and adjacent to intermediate the ends of the wagon forwardly of assembly 7 rotatably mounted from the sides 20 and 21 of the box.

The forward end of the box contains the stripper elevator conveyor 10 which extends the width of the box between the sides 20 and 21 and at its lower end is disposed in receiving relationship to the discharge end of the bed conveyor within a shallow trough 22 extending beneath the wagon bottom and connected thereto beneath a slot 22a formed at the forward terminus of the bed conveyor in the wagon bottom to accommodate the return of the apron 14 beneath the wagon bottom. The stripper conveyor 10 is inclined upwardly forwardly and is of the endless chain type including endless side chains 23 with cross-slats 23a trained about sprocketed upper and lower sprocketed roller or journal assemblies 24 and 25, the lower journal assembly 25 being rotatably mounted on a cam shaft 26 which is journaled at opposite ends through depending supports 27, 27 connected to the side sills of the framework.

It will be seen that the elevator stripper conveyor extends the full width of the box between the sides 20 and 21 thereof and at its bottom end is disposed in receiving relationship to the discharge forward end of the body bed conveyor or unloading means and inclines upwardly forwardly therefrom and at its upper end is spaced a substantial distance rearwardly from the forward side or wall 28 of the wagon box or body to provide a discharge space 29 therewith.

It will be seen that the upper end of the scraper elevator conveyor is driven through the upper roller assembly 24 which comprises sprockets driving the chain apron 23a, the sprockets being connected to a stripper conveyor drive shaft 30 extending crosswise of the box parallel to the shaft 26 and journaled from opposite sides or walls 20 and 21 of the box. The apron 23 comprises an active or advance run 31 facing into the box in engaging relationship to the load therein, and the apron 23 comprises a return run 32 facing toward the forward bottom corner of the box. The apron has its series of cross-scraper slats or bars 23a interconnecting the chain 23 for carrying the load over its upper discharge end 33 which is slightly below the upper edges of the box.

The load discharges through the space 29 into the transverse trough 11 which opens upwardly and extends partially beneath the scraper elevator conveyor in receiving relationship thereto. The trough 34 extends substantially the full width of the box and communicates with an opening 35 in the side of the box through which the load is discharged into a chute 36 which projects laterally outwardly of the side 21 of the box.

The trough 11 constitutes one portion of the lateral or cross-conveyor and encloses the bottom side of the auger 12 which has an open end at the opening 34, the auger being carried by a shaft 38 journaled in the trough's closed end 39 located at the side 20 of the box.

It will be seen from a consideration of Figures 1 and 3 that the return run 32 of the elevator conveyor passes in close proximity over the upper extent of the flighting of the auger and that in view of the direction of the discharge of the said elevator conveyor, the tendency is for the load to bunch up against the forward wall 28 of the box and that the disposition of the return stretch 32 tends to scrape the load within the space 40 above the trough and between the interior of the front wall 30 of the box and elevator conveyor side 32 so as to more uniformly distribute the load transversely across the auger cross-conveyor, the stretch 32 moving over a panel 32' which extends from an adjacent edge of trough 11 to the adjacent edge of trough 22 to accommodate recirculation of the material.

It will be seen that in order to prevent any of the load from dropping through the chain 23 and slats 23a of the elevator conveyor, that the advance and return runs of the elevator conveyor are separated by a sheet steel panel 41 sloping upwardly forwardly and of the width of the box and extending from the shaft 30 to the shaft 26.

It will be noted from a consideration of the drawings that the novel arrangement herein presented employs extremely short drives from the power take-off through the medium of a shaft assembly 42 which extends from the conventional rear power take-off drive of the associated tractor and at its output end terminates in a gear box 44 which presents stub shafts 45 and 46 at opposite sides extending transversely of the box, the shaft 45 being located on the discharge side of the box and affording a connection for an associated blower mechanism (not shown) in the event that the unloading crop is to be stored in a silo as will be readily understood by those skilled in the art.

The shaft 46 is provided with a sprocket 48 which drives a chain 49 trained about a sprocket 50 which is keyed to a counter-shaft 51 journaled at 52 in bearings carried in the framework of the wagon beneath the trough 34, the countershaft 51 extending to the right side of the vehicle and is keyed to a sprocket 53 which drives a chain 54 which in turn drives a sprocket 55 which is keyed to the extension of the shaft 38 of the auger.

The chain 54 may be associated with an idler sprocket 56 movably mounted on a standard 57 connected to the right side 20 of the box and extending between the shafts 51 and 38 in order to rigidify this area. The shaft 38 may carry and have keyed thereto a sprocket 58 (Figure 4) which may drive a chain 59 extending upwardly therefrom and trained about the sprocket 60 keyed to the driving shaft 30 at the upper end of the scraper-elevator conveyor.

The counter-shaft 51 may be keyed to a sprocket 61 which may drive a chain 62 extending rearwardly therefrom and driving a sprocket 63 keyed to the cam-shaft 26 at the lower end of the scraper-elevator conveyor. The opposite end of the shaft 26, that is outwardly of the side 21 of the box, may be associated with a step-by-step transmission means of a variable adjustment type, the transmission means comprising a cam member 64 keyed to the shaft 26 and presenting a driving profile 65 adapted for engagement with a roller 66 rotatably journaled on the lower end of an arm assembly 68 which is pivoted about a shaft 19a which drives the roller 19 of the bed conveyor. The arm assembly 68 is provided with a pair of spring biased pawls 70, 70 which are urged into engagement with the teeth on the periphery of a ratchet wheel 71 keyed to the shaft 19a and driving the same.

It will be appreciated that rocking of the arm assembly in a counter-clockwise direction as seen in Figure 3 will rotate the ratchet in a counter-clockwise direction and also the roller assembly 19 thereby moving the top active run 15 of the apron of the bed conveyor 9 to the forward end of the box and effecting a discharge of the load to the scraper conveyor.

The ratchet wheel is also associated with a detent 73 pivoted to the adjacent side rail as at 74 and spring biased into engaging relationship with the teeth of the ratchet wheel through the medium of a spring 75 which is under tension between the upper end of the arm assembly and an arm portion 76 of the detent 73. It will be observed from a consideration of Figure 3 that the arm assembly is constantly biased in a clockwise direction in order to engage the roller with the profile of the cam.

The upper end of the arm assembly 68 has a lost motion connection 77 with one end of an adjustable pull rod 78 of a load volume control generally designated 79. The opposite end of the pull rod, the pull rod extending diagonally upwardly forwardly, is adjustably connected to an upstanding arm 80 of a gate assembly 81, the arm 80 having its lower extremity rigidly secured as at 82 to one end of a cross-shaft 83 which is pivoted through the sides 20 and 21 of the box and intermediate the sides is fixedly connected to the lower margin of the gate member 81, said gate member being in the form of a sheet metal element extending the width of the box, and the shaft 80 being disposed beneath the level of the upper discharge end 33 of the scraper-elevator conveyor adjacent to the inner side of the front wall 30 of the box. The gate comprises a substantially flat portion 84 extending generally radially from the axis of pivot of the shaft 81 and intermediate its ends in angled in a direction toward the elevator conveyor to provide an outer portion 85 which is adapted to be engaged by the material discharging at the upper extremity of the elevator conveyor.

The upper or outer end portion 85 of the gate member or flap 81 has a return bent portion 87 angled in a direction toward the forward wall 28 of the box and curved concentric with the axis of shaft 83 and having a rolled edge to provide a catch portion 88 adapted to snap in front of the front wall of the box over the upper edge thereof in order to limit movement of the gate toward the conveyor 10.

The volume control 79 functions as follows:

The load discharging over the upper discharge end 33 of the elevator conveyor 10 engages the facing side of the gate and swings the gate upwardly and toward the forward wall 30. In view of the lost motion connection at 77 in the linkage between the transmission and the gate, substantial movement of the gate 81 is accommodated without actuation of the transmission. Beyond a predetermined limit which corresponds to a predetermined load volume discharging over the discharge upper edge of the elevator conveyor, the gate or flap is swung sufficiently forwardly to rotate the arm assembly 68 in a counterclockwise direction disengaging the cam roller at least partially from the cam. This in turn limits or regulates the drive for the bed conveyor and therefore reduces the load volume being discharged by the elevator conveyor. It will be understood that if the gate is swung past a predetermined limit, that the bed conveyor will be stopped inasmuch as the transmission means will be completely disengaged.

The drive from the power-takeoff to the cam shaft and the other conveying means proceeds from the power-take-off of the tractor through shaft 42 through the gear box 44 through shaft 46, sprocket 48, chain 49, sprocket 50, counter-shaft 51, sprocket 53, chain 54 and sprocket 55 to drive the auger. Sprocket 58 transmits the drive through chain 59 to sprocket 60 to drive the shaft 30 and thus the conveyor 10 which runs constantly.

The shaft 51 through sprocket 61 drives chain 62 which through sprocket 63 drives shaft 26 which actuates the cam and drives the transmission to drive the bed conveyor.

It will be appreciated that a novel self-unloading wagon is obtained and has been found in actual practice to require only a single operator, that is, the tractor driver. A rugged and compact mechanism which carries the load in ideal position is achieved, and the drives are extremely short and simple. It will be understood that in lieu of the power-take-off arrangement the shafting 42 may be driven by a separate engine.

We claim:

1. In a self-unloading vehicle comprising a box, unloading means cooperatively associated with the box for moving the load in a predetermined direction, a scraper elevator conveyor extending across the box in the path of the discharging load and angled upwardly from its lower end to its upper end in said direction and discharging over its upper end and defining a downwardly widening pyramidal-shaped passageway with the adjacent sides of the box, a cross-conveyor disposed in the base lower end of the passageway and extending transversely of the box partially beneath said elevator conveyor in receiving relationship thereto and adapted to move the load laterally and discharge it through an opening in the side of the box, said scraper elevator conveyor comprising an endless apron having an advance run facing into the box and engaging the load and having a return run with a substantial portion disposed transversely to the direction of discharge of said cross-conveyor and vertically spaced therefrom in raking relationship to load piles deposited on the cross-conveyor of over a predetermined height to spread the load across the width thereof.

2. In a self-unloading wagon comprising a box having spaced side walls and interconnecting end walls, a wheeled supporting chassis therefor, a bed conveyor and an elevator conveyor within the box disposed in series, said elevator conveyor having a lower end adjacent and receiving from one end of the bed conveyor and having an upper discharge end disposed in spaced relationship to one adjacent end wall and defining a discharge passage therewith, a control gate movably mounted from the walls of the box and swingable across said opening from said one end wall toward said upper end of said elevator conveyor across the path of material discharging from said upper end of the elevator conveyor, drive means operatively associated with said elevator conveyor for continuously operating the same, transmission means between said drive means and said bed conveyor for actuating the latter from the former, said transmission means being disconnectible to interrupt said drive, and means operatively connecting said transmission means with said gate for actuation by the latter in response to movement thereof said gate including a portion adapted to cover the upper end of said opening attendant to said gate swinging toward said elevator conveyor.

3. In a self-unloading wagon comprising a box with spaced side walls and inter-connecting end walls, a continuously driven elevator conveyor within the box extending from intermediate the ends of the box diagonally upwardly toward one of said end walls and spaced therefrom at its upper end longitudinally of the box and defining a discharge passage therewith, unloading means in the box for moving the material against said elevator conveyor, driving means for said unloading means, a cross-shaft pivoted from the side walls of the box below said upper end of the elevator conveyor adjacent to the interior of said one end wall, a gate having a lower edge connected to said cross-shaft and extending upwardly therefrom above the upper end of the elevator conveyor and swingable to and fro with respect thereto across said passage, said gate having a portion extending from its upper edge toward and over the upper edge of said one end wall and curved generally concentric with the axis of said cross-shaft, depending means on said portion extending below the upper edge of said one end wall and adapted to engage with its external side to limit movement of said gate toward said elevator conveyor, drive establishing and interrupting means between said unloading means and said driving means, and means operatively interconnecting said drive establishing and interrupting means with said gate for actuation thereby.

4. In an unloading arrangement for a vehicle having a box, a wheeled chassis supporting the box, a bed conveyor extending along the bottom of the box from one end thereof to intermediate its ends, an elevator conveyor extending from adjacent to the opposite end of the box to the adjacent end of said bed conveyor in receiving relationship thereto, a laterally extending trough beneath said elevator conveyor connected to opposite sides of the box along the corner formed by said opposite end of the box and the bottom thereof and disposed in receiving relationship to the adjacent end of said elevator conveyor, an auger operatively positioned in the trough for discharging material from one end thereof through an opening in one side of the box and having a shaft rotatably carried from the opposite side wall, driving means for said conveyors and said auger and comprising a transmission adapted for connection to the power-take-off of an associated tractor and including a gear box carried by the chassis adjacent to said opposite end of the box, said gear box having an output shaft, a first sprocket connected thereto, a countershaft carried by the chassis below the trough, a second sprocket on the countershaft chain driven from the first sprocket, a third sprocket on the countershaft, a fourth sprocket on the shaft of said auger chain driven from the third sprocket, a fifth sprocket on said shaft of the auger, drive transmitting means for the elevator conveyor including a shaft rotatably mounted from said sides of the box and carrying one end of said elevator conveyor and including a sixth sprocket chain driven from said fifth sprocket, a seventh sprocket on said counter shaft, a cam-shaft extending through the sides of the box and mounting the opposite end of the elevator conveyor, an eighth sprocket on the cam-shaft driven from the seventh, means including a shaft extending through the sides of the box for driving and supporting one end of the bed conveyor adjacent to said elevator conveyor, and drive transmitting means operatively interconnecting said last-mentioned shaft and said cam-shaft.

5. In a self-unloading vehicle of the type adapted to be powered from the power-take-off of an associated tractor and comprising a wheeled box, a bed conveyor on the bottom of the box and extending from the rear end of the box to intermediate the ends thereof and comprising an endless apron, means journaling each end of the apron and comprising a cross-shaft, an elevator conveyor extending across the forward end of the box in receiving relationship to the forward discharge end of the bed conveyor, an auger cross-conveyor disposed beneath the elevator conveyor in receiving relationship thereto and discharging through an opening in the side of the box, said auger conveyor comprising an auger and a trough having an open end coincident with said opening, said auger having a shaft carried by the opposed closed end of the trough, drive transmitting means extending from the forward end of the box for connection to an associated power-take-off and terminating in a gear box carried by the vehicle at the front of said box, said gear box having an output shaft extending from each side, a drive shaft for the elevator conveyor journaled through the sides of the box, and an operative drive connection between one of said output shafts and said auger shaft and the cross-shaft of the bed conveyor adjacent to the forward end of the box, the other of said output shafts providing a drive for an associated blower.

6. In a self-unloading wagon having a wheeled chassis with a box thereupon comprising a bottom, front and rear end walls and interconnecting sides and conveying means within the box having a first section extending from said one wall to intermediate the ends of the box and a second section extending from intermediate the ends of the box diagonally upwardly to adjacent the other wall and having a first receiving end disposed in receiving relationship to the adjacent end of said first section at the intermediate portion of the box, said second section having a second discharge end disposed below the upper level of the box and spaced from said other end wall and defining a discharge passage therewith and adjacent portions of said ends, means for continuously driving said second section, means for intermittently driving said first section, and load responsive means for controlling said intermittent drive disposed in intercepting relationship to the load discharged from said second end for establishing or disconnecting said intermittent drive means as predetermined, said means mounted on said box and swingable to and fro with respect to second discharge end of said second section of said conveying means and disposed in covering relation to said passage when the material load in said passage is below the upper level thereof.

7. In a self-unloading wagon having a box and conveying means therein extending from the rear end of the box along its bottom and intermediate the ends of the box extending diagonally upwardly and terminating adjacent to the forward end of the box and defining a discharge passage therewith, and means for regulating the volume of flow of the material from said conveyor to the passage and comprising a member including a gate portion pivotally mounted on the box and extending between the front end of the box and the adjacent end of said conveying means, said gate portion having an upper edge, and a combined cover and stap extending from said upper edge of the gate portion toward and over the upper edge of the forward end of the box and having a depending part adapted to catch in front of said front end of the box to limit swinging of the member toward said conveying means.

8. In a mechanism for unloading material from a wagon comprising a box with a bottom, spaced end and side walls, a first conveyor having one end positioned adjacent to the bottom of the box and said conveyor extending from the bottom of the box diagonally upwardly and terminating in a second end adjacent to one of said end walls and defining a passage therewith through which material may flow downwardly between adjacent portions of the side walls of the box, a transverse trough connected to the bottom of the box beneath said one end of the first conveyor and communicating with the interior of the box through a slot in the bottom for receiving material from the box thereinto, a lateral conveyor comprising an upwardly open trough disposed in partially underposed receiving relationship to said second end of said first conveyor and in vertical alignment with said passage, said last-mentioned trough having an upper edge disposed beneath and proximate to the underside of said first conveyor, a panel connected at one end to said upper edge of said last-mentioned trough and extending generally parallel to said first conveyor below and spaced from the underside thereof and merging at its opposite end into the first-mentioned trough, said first conveyor comprising an endless slatted apron having an upper run facing into the box and a bottom run facing said second mentioned trough and passing thereabove and over said panel and adapted to rake over the load in said second-mentioned trough upon it reaching a predetermined height for distributing the load laterally across said second-mentioned trough and for scrapping off the top excess of the load of material in the second-mentioned trough and delivering the same along said panel to the first-mentioned trough for recirculation.

9. In a self-unloading vehicle of the type adapted to be powered from the power-take-off of an associated tractor and comprising a wheeled box, a bed conveyor on the bottom of the box and extending from the rear end of the box to intermediate the ends thereof and comprising an endless apron, means journaling each end of the apron and comprising a cross-shaft, an elevator conveyor extending across the forward end of the box in the path of material discharging from the forward end of the bed conveyor, a cross-conveyor disposed beneath the elevator conveyor in receiving relationship thereto and discharging through an opening in the side of the box, said cross-conveyor comprising auger means and trough means having an open end coincident with said opening, said auger means having shaft means carried by the opposite closed end of the trough, drive-transmitting means extending from the forward end of the box for connection to an associated power-take-off and terminating in a gear box carried by the vehicle at the front of said box, said gear box having an output shaft extending from each side, a drive shaft for the elevator conveyor journaled through the sides of the box and an operative drive connection between one of said output shafts and said auger shaft means and the cross-shaft of the bed conveyor adjacent to its forward end and said drive shaft of the elevator conveyor, the other of said output shafts providing a drive for an associated blower.

10. In a self-unloading vehicle of the type adapted to be powered from the power-take-off of an associated tractor and comprising a wheeled box, a bed conveyor on the bottom of the box and extending from the rear end of the box to adjacent the front end thereof, means journaling each end of the apron and comprising forward and rear cross-shafts, stripping and conveying means extending across the forward end of the box in receiving relationship to the adjacent end of the bed conveyor, a cross-conveyor disposed beneath said conveying means in receiving relationship thereto and discharging through an opening in a side of the box, said cross-conveyor comprising a drive shaft journaled on the box adjacent its forward end, said conveying means including a shaft journaled on a side of the box adjacent its forward end, drive-transmitting means extending from the forward end of the box for connection to an associated power-take-off and terminating in a drive-transmitting assembly carried by the vehicle at the front of said box, and an operative driving connection between said assembly and said shaft of the cross-conveyor, the forward cross-shaft of the bed conveyor and said shaft of said stripping and conveying means and all disposed adacent to the front end of the box.

References Cited in the file of this patent

UNITED STATES PATENTS

| | | |
|---|---|---|
| 981,652 | D'Homergue | Jan. 17, 1911 |
| 1,075,779 | Gerber | Oct. 14, 1918 |
| 1,778,393 | Klugh | Oct. 14, 1930 |
| 2,057,403 | Vali et al. | Oct. 13, 1936 |
| 2,104,191 | Flynn | Jan. 4, 1938 |
| 2,143,749 | Wessman | Jan. 10, 1939 |
| 2,221,266 | Roach | Nov. 12, 1940 |
| 2,321,168 | Tognetti | June 8, 1943 |
| 2,383,412 | Orendorff | Aug. 21, 1945 |
| 2,434,718 | Recker | Jan. 20, 1948 |
| 2,503,129 | Pautz | Apr. 4, 1950 |
| 2,563,321 | Dugan | Aug. 7, 1951 |
| 2,573,193 | Goldsberry | Oct. 30, 1951 |
| 2,612,294 | Dorschner | Sept. 30, 1952 |

FOREIGN PATENTS

| | | |
|---|---|---|
| 165,888 | Germany | Dec. 1, 1905 |
| 738,922 | France | Oct. 24, 1932 |